United States Patent [15] 3,676,651
McDaniel [45] July 11, 1972

[54] RAPID RETRACT FOR THREAD CUTTING

[72] Inventor: George H. McDaniel, Northville, Mich.
[73] Assignee: The Bendix Corporation
[22] Filed: Sept. 21, 1970
[21] Appl. No.: 73,937

[52] U.S. Cl. .................. 235/151.11, 90/11.42, 90/11.5, 318/569
[51] Int. Cl. .................................................. G06f 15/46
[58] Field of Search ............... 235/151.1, 151.11; 318/567, 318/569, 571, 573–574, 594; 90/11.4, 11.42, 11.5, 11.54, 11.56

[56] References Cited

UNITED STATES PATENTS

| | | |
|---|---|---|
| 3,417,303 | 12/1968 | Reuteler ..................... 235/151.11 X |
| 3,582,749 | 6/1971 | Wenzel ............................... 318/571 |
| 3,428,876 | 2/1969 | Kelling .............................. 318/571 |
| 3,538,315 | 11/1970 | Reuteler ........................ 318/571 X |
| 3,557,350 | 1/1971 | Proctor ........................ 235/151.11 |
| 3,479,574 | 11/1969 | Kosem ......................... 318/569 X |
| 3,383,573 | 5/1968 | Hillyer ............................. 318/569 |
| 3,579,070 | 5/1971 | Crocker et al. .................. 318/571 |

Primary Examiner—Joseph F. Ruggiero
Assistant Examiner—Jerry Smith
Attorney—William F. Thornton and McGlynn, Reising, Milton & Ethington, Plante, Hartz, Smith & Thompson

[57] ABSTRACT

A numerical control system for performing a thread cutting operation on a lathe and responding to programmed path and final position coordinates to immediately execute a rapid tool retraction whenever one of the two controlled axes is in the final coordinate position.

10 Claims, 3 Drawing Figures

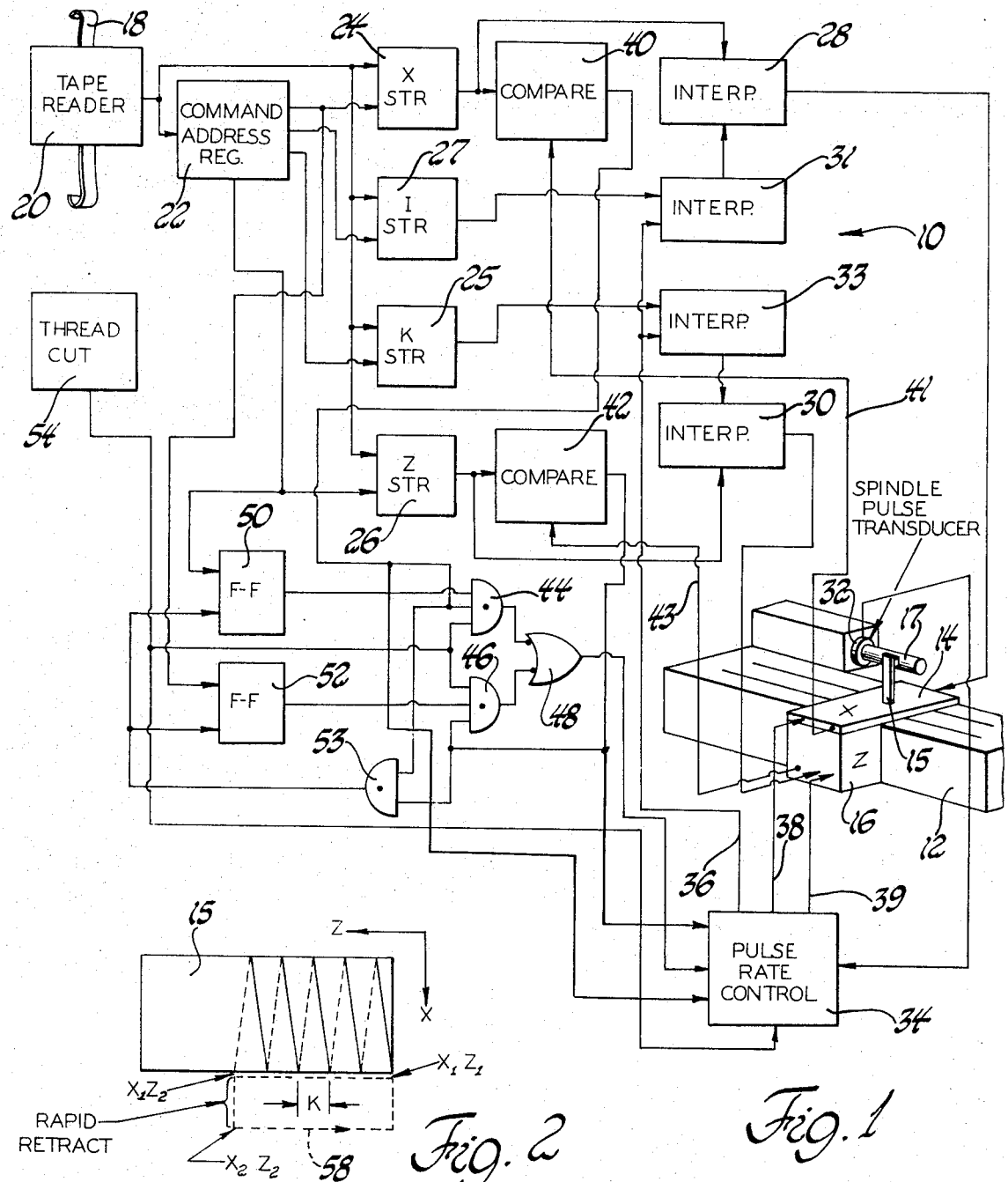
Fig. 1
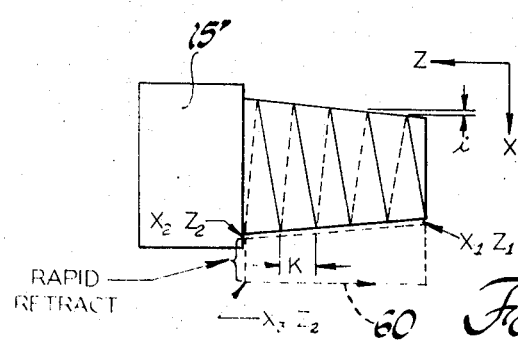
Fig. 2
Fig. 3
INVENTOR.
George H. McDaniel
BY
Barnard, McGlynn & Reising
ATTORNEYS

RAPID RETRACT FOR THREAD CUTTING

INTRODUCTION

This invention relates to numerical control systems for lathes and particularly to apparatus for accomplishing a rapid tool withdrawal at a preselected point in a cutting operation.

BACKGROUND OF THE INVENTION

In numerically controlled machinery such as lathes, a tool is guided relative to a workpiece according to position and feedrate commands. These commands may either be dialed in manually through a control panel or read from a prepared program tape. One common use of numerically controlled lathes is the cutting of threads in the workpiece. This is ordinarily a very precise operation in which the tool must engage and disengage the workpiece at certain preselected points. The disengagement step must in some instances be carried out at a rapid traverse rate to clear a shoulder or step in the workpiece or to produce a clean termination in the thread for some other reason.

One way to accomplish a rapid retract operation is to read and store position commands in advance of the execution thereof; that is, to transfer a position command to a buffer storage location while the preceeding command is being executed. This permits a retraction path and a retraction feedrate to be separately programmed and carried out immediately upon completion of the thread cutting displacement step. However, buffer storage facilities for rapid execution of discrete retraction path and feedrate information are not available on many controllers and to add such a facility would add cost and complexity to such controllers. Accordingly, retraction is typically carried out by reading and interpolating an additional tape block. This is a relatively slow operation and in many cases does not afford sufficient retraction speed for thread cutting purposes.

BRIEF STATEMENT OF THE INVENTION

According to the present invention, a rapid tool element retraction may be accomplished at a preselected point in a displacement path without the need for reading a separate program block defining the retraction step and without the need for buffer storage to read and store retraction motion data prior to execution. In general, this is accomplished to responding to program data to move a tool element at a relatively slow rate along a predetermined path having a component along at least one axis of tool movement, sensing an identity of tool position with one final position coordinate previously read from the program and performing a relatively rapid tool traverse along the other of the tool axes until the second final position coordinate is reached.

In a preferred embodiment disclosed herein, a tool path for thread cutting purposes is programmed by defining initial position, thread lead along each axis of tool movement in relation to spindle revolution, and the final tool position coordinates at the completion of the retraction step. Comparator means are provided to determine when actual position as represented by a feedback signal equals a final position coordinate for one axis. At this time logic means causes an identity signal to be conducted to a feedrate control which immediately traverses the tool at maximum rate along the other axis. When the second final position coordinate is reached, tool element displacement is terminated subject to the reading of additional program data.

The various features and advantages of the invention will become readily apparent upon reading the following specification which describes a specific embodiment, the specification to be taken with the accompanying drawings of which:

FIG. 1 is a block diagram of a specific embodiment of the invention;

FIG. 2 is a schematic diagram of a first thread cutting operation; and

FIG. 3 is a schematic diagram of a second thread cutting operation.

In FIG. 1, a numerical control system 10 is shown for operating a two axis lathe 12 having X and Z axis displacement control units 14 and 16 such as reversible motors and jack screws for positioning tool slides along perpendicular X and Z axes. The positions of the tool 15 relative to workpiece 17 are controlled by the units 14 and 16 in accordance with commands read from a position program tape 18 by an eight channel tape reader 20. The position commands for the X and Z axes are read sequentially and decoded by address register 22 for transfer to appropriate X and Z storage registers 24 and 26, respectively. In addition, K and I commands defining the Z and X axis advance per spindle revolution are read from tape 18 and transferred to storage registers 25 and 27.

From registers 24 and 26, the commands are transferred directly to interpolators 28 and 30 for generation of command pulses which are applied to the displacement control units 14 and 16, respectively. In addition, I and K commands are transferred directly to feedrate interpolators 31 and 33, respectively. Feedrate interpolators 31 and 33 are connected to supply feedrate pulses to interpolators 28 and 30, respectively. Interpolators 28, 30, 31, and 33 are typically digital differential analyzers. For thread cutting purposes, add pulses from a spindle transducer 32 are applied to the interpolators 31 and 33 to determine the rate of the command pulses and thus to determine the X and Z displacement rates. Pulses from the spindle transducer 32 occur at a rate which is directly proportional to the rotational speed of the lathe spindle and thus feedrate is slaved to spindle rotation rate. Transducer 32 typically produces 10,000 pulses per spindle revolution. The transducer add pulses are directed through pulse rate control unit 34 which performs a simple gating function to either output pulses at the spindle transducer rate on line 36 or to output maximum rate pulses on either of lines 38 and 39 connected directly to the X and Z axis displacement control units for purposes to be described.

A substantially closed loop position control scheme is accomplished in the embodiment of FIG. 1 wherein position commands are compared to actual position signals to produce signals which are employed for control purposes. This scheme includes comparators 40 and 42 connected to receive the X and Z position commands as well as X and Z actual position feedback signals from control units 14 and 16, respectively. The feedback signals are typically generated by resolvers or the like and appear on lines 41 and 43. The outputs from comparators 40 and 42 are identity signals which are high whenever the differences between the actual and position machine tool slide positions along the respective control axes are zero. It will be understood that comparators 40 and 42 may also be employed to produce conventional error signals indicating the difference between the actual and commanded positions for comparison to trip points at which motor speed control functions may be carried out. Such error signal usage is disclosed in the copending application Bendix INC 70-6 (P-336) and will not be described in detail herein.

The X and Z axis identity signals are applied to inputs of coincidence gates 44 and 46, respectively. The outputs of the gates 44 and 46 are connected to inputs of an inclusive OR gate 48, the output of which is connected to the pulse rate control unit 34 to activate line 38 or 39 whenever the output of gate 48 is high. Additional inputs to gates 44 and 46 are received from flip-flops 50 and 52. These flip-flops are set by X and Z axis address signals Xa and Za from register 22. Thus, flip-flop 50 is set by any X address command and flip-flop 52 is set by any Z address command. Enabling inputs to gates 44 and 46 are received from the thread cutting signal unit 54 which is activated for any thread cutting operation to distinguish thread cutting from other IPR operation where rapid retract is not desirable. Flip-flops 50 and 52 are reset by the coincidence of both X and Z identity signals at the inputs of AND gate 53.

Accordingly, the output of gate 44 is high whenever the thread cutting signal from unit 54 is high, the flip-flop 50 is set indicating that the X axis command is being executed and the X axis feedback signal equals the X axis position command, i.e., the final position coordinate along the X axis has been reached. At this point the gates 44 and 48 produce a high output to pulse rate control unit 34. Line 39 is activated to displace the tool along the Z axis at maximum traverse rate. Similar operation obtains for the Z axis gate 46 to activate line 38.

Referring now to FIG. 2, a typical operation of the system 10 of FIG. 1 is shown for producing a straight thread on workpiece 15. The tool is initially positioned at coordinates $X_1 Z_1$ to engage the workpiece 15. The program tape 18 is read to determine the tool advance along the Z axis for each spindle revolution. This is contained in the K command placed in storage register 25. The tool advance along the X axis for each spindle revolution is contained in the I command which, in the example of FIG. 2, is zero. In addition, the final position coordinates $X_2 z_2$ are read from tape 18 and placed in registers 24 and 26.

As the tool advances along the thread cutting portion of path 58, the K command controls until the position defined by coordinates $X_1 z_2$ is reached. At this point, the Z axis feedback signal equals the Z axis command and comparator 42 produces the Z identity signal. The reading of the $Z_2$ command had previously set flip-flop 52 and the thread cutting operation was begun by activating unit 54. Accordingly, the identity signal completes the inputs to gate 46, permitting the identity signal to propagate through gates 46 and 48 to the pulse rate control unit 34. Line 38 is activated to override the normal feedrate operation and traverse along the X axis at maximum rate. The maximum rate traverse continues until the final position coordinates $X_2 z_2$ are reached at which time the X identity signal is produced by comparator 40. This completes the inputs to gate 53 to reset flip-flops 40 and 42 and terminate the traverse. Further tool movements are subject to further tape reading.

The symmetry of the system 10 permits a spiral thread to be cut in an end face of workpiece 15 by a first relatively slow advance along the X axis, followed by a rapid retract back along the Z axis. The operation of system 10 is essentially the same as for the example of FIG. 2 except that the axis designations are interchanged.

Referring to FIG. 3, the cutting of a tapered thread in a workpiece 15' is shown to involve the programming of a tool path 60 having a rapid retract along the X axis from coordinates $X_2 Z_2$ to $X_3 Z_2$. The path 60 is defined by the initial coordinates $X_1, Z_1$, the Z axis lead K and the X axis lead I, together with the final position coordinates $X_3 Z_2$. Just as in the example of FIG. 2, the point defined by the end-of-thread coordinates $X_2 Z_2$ is not programmed separately.

In operation, the tool path 60 is followed from $X_1 Z_1$ to $X_2 Z_2$ at which time the Z identity signal appears due to the equality of the Z feedback signal with the Z final position command in register 26. The Z identity signal propagates through gates 46 and 48 to activate line 38 to traverse along the X axis at maximum system rate. When the tool reaches final coordinates $X_3 Z_2$, the X identity signal is generated to enable gate 53 and to reset flip-flops 50 and 52. This terminates the tool movement subject to further tape reading.

It is to be understood that the foregoing description is illustrative in character and is not to be construed in a limiting sense.

The embodiments of the invention in which an exclusive property or privilege is claimed are defined as follows:

1. In a numerical control system for a machine having an element movable along at least two axes, a rapid tool retractor subsystem for withdrawing a tool from a workpiece at the end of a prescribed operation on said workpiece and comprising: first means responsive to program data for moving the element at a first relatively slow rate along a path wherein said tool engages the workpiece and having a component lying along at least one of the axes; second means for storing program data specifying final position coordinates of the element along the axes; said final position coordinates defining the end of a total tool displacement path including a first path portion in engagement with the workpiece and a retract path portion not in engagement with the workpiece, and third means responsive to the element reaching a final position coordinate along said one axis signifying the end of said first path portion of tool displacement to move the element to the final position coordinate along the other axis at a second relatively fast rate to accomplish the retract portion of tool displacement.

2. Apparatus as defined in claim 1 including a tape reader for supplying the program data.

3. Apparatus as defined in claim 1 wherein the third means includes feedback means for producing actual position signals for the element along each of the axes, comparator means for comparing the actual position signals to the program data from the second means and producing an identity signal when said signals are equal, and means responsive to an identity signal to move the element at a maximum rate.

4. Apparatus as defined in claim 3 including gate means for conducting the identity signal only during a thread cutting operation.

5. Apparatus as defined in claim 3 including coincidence gates for each of the axes, bistable switch means for each axis and responsive to program data from the respective axes to assume set conditions, the switch means being connected to respective coincidence gates to enable the gates when in the set condition, the gates being connected to receive an identity signal from respective axes, and additional gate means for conducting an identity signal from either of the coincidence gates enabled.

6. Apparatus as defined in claim 5 including means for resetting the bistable switch means when the element reaches both of the final position coordinates.

7. Apparatus as defined in claim 1 wherein the first means includes interpolator means for each axis responsive to position commands and feedrate pulses to produce command pulses for application to an element-positioning mechanism.

8. Apparatus as defined in claim 7 including a spindle pulse transducer for producing feedrate pulses at a rate related to the spindle rotation rate of the machine.

9. Apparatus as defined in claim 8 wherein the third means includes feedrate control means responsive to the element reaching a final position coordinate along said one axis for producing control pulses at a maximum traverse rate thereby overriding said feedrate pulses.

10. Apparatus as defined in claim 9 including means for discontinuing said control pulses when the element reaches the other final position coordinate.

* * * * *